United States Patent [19]
Zimmerman

[11] Patent Number: 6,126,196
[45] Date of Patent: Oct. 3, 2000

[54] AIRBAG MODULE

[75] Inventor: Michael Zimmerman, Alzenau, Germany

[73] Assignee: BSRS Restraint Systems GmbH, Alzenau, Germany

[21] Appl. No.: 08/981,718

[22] PCT Filed: Jun. 20, 1996

[86] PCT No.: PCT/EP96/02670

§ 371 Date: Feb. 25, 1998

§ 102(e) Date: Feb. 25, 1998

[87] PCT Pub. No.: WO97/01459

PCT Pub. Date: Jan. 16, 1997

[30] Foreign Application Priority Data

Jun. 27, 1995 [DE] Germany .............................. 195 22 765

[51] Int. Cl.[7] .................................................. B60R 21/30
[52] U.S. Cl. .................................... 280/739; 280/743.1
[58] Field of Search ................................ 280/739, 743.1, 280/728.1, 742

[56] References Cited

U.S. PATENT DOCUMENTS

| | | | |
|---|---|---|---|
| 3,788,666 | 1/1974 | Kramer et al. | 280/739 |
| 3,792,873 | 2/1974 | Buchner et al. | 280/743.1 |
| 5,405,166 | 4/1995 | Rogerson | 280/739 |
| 5,454,595 | 10/1995 | Olson et al. | 280/743.1 |
| 5,489,117 | 2/1996 | Huber | 280/739 |
| 5,492,362 | 2/1996 | Lehman et al. | 280/739 |
| 5,584,508 | 12/1996 | Maruyama et al. | 280/743.1 |

FOREIGN PATENT DOCUMENTS

| | | |
|---|---|---|
| 495 409 A1 | 7/1992 | European Pat. Off. . |
| 2 131 070 | 11/1972 | France . |
| 2 203 956 | 5/1974 | France . |
| 21 63 919 | 7/1972 | Germany . |
| 25 42 764 | 4/1977 | Germany . |
| 40 11 492 A1 | 10/1991 | Germany . |
| 2212239 | 8/1990 | Japan . |
| 6286568 | 10/1994 | Japan . |
| 1 473 794 | 5/1977 | United Kingdom . |

*Primary Examiner*—Lanna Mai
*Assistant Examiner*—Lynda Jasmin
*Attorney, Agent, or Firm*—Akin, Gump, Strauss, Hauer & Feld, L.L.P.

[57] ABSTRACT

An air bag module is described which has a gas generator, which upon a trigger signal instantaneously conducts gas into an air bag made of a substantially air-impermeable material. The air bag has an air outlet opening, through which gas flows out of the air bag after a dwell time in the air bag. It is proposed that the effective opening diameter of the air outlet opening (40) is opened in a time-delay manner after the activation of the time module. If necessary, the volume can be increased briefly in order to keep the internal pressure constant in the air bag for a predetermined time period.

1 Claim, 2 Drawing Sheets

AIRBAG MODULE

BACKGROUND OF THE INVENTION

The invention involves an air bag module for use preferably in a motor vehicle.

Air bags have been used for a long time as a passive restraint system in motor vehicles. Known modules customarily have a gas generator which instantaneously conducts gas into an air bag upon a trigger signal. The air bag has an air outlet opening, through which the gas flows out of the air bag after a holding time in the air bag. The trigger signal is customarily generated by a crash sensor.

Air bags which are ready for operation are folded together in a capsule. If the gas generator is then activated, gas flows into the air bag, which consequently bursts the capsule, whereupon the air bag is blown up by the gas to full size, in order to protect the vehicle passengers from the consequences of a crash for a certain period of time, 30 ms for example. After reaching the maximum internal pressure in the air bag, the gas escapes through the air outlet opening.

Fundamentally, the known air bag modules address the problem of creating, within a very short period of time, a high enough internal gas pressure in the air bag to soften a submersion of the body parts of the vehicle passengers. In known modules, however, the situation can occur where the body parts are already submerged in the air bag, when the internal pressure built up is not yet high enough to completely unfold the cushioning effect.

This problem is made clear using the two drawing FIGS. 1 and 2.

FIG. 1 shows a known air bag 1, which is equipped with a mounting plate 2 for a gas generator (not shown). The gas generator is connected to the inlet nozzles 3, through which gas flows into the interior of the air bag 1 upon activation. The air bag is equipped with an air outlet opening or vent hole 4, which is always open.

The temporal behavior of this known air bag can be modelled using the temporal progression of the internal pressure P in the air bag 1 according to FIG. 2.

The air bag 1 is—as already mentioned—folded in a capsule, saving space, in the ready-to-operate condition. At the point in time t=0, the gas generator is set off and gas flows into the air bag 1, whereupon the internal pressure of the gas in the air bag instantaneously increases.

As already explained, the air outlet opening 4 is continuously open, i.e. gas flows out of the opening 4 even during the filling operation, so that one may clearly speak of a leakage during the filling operation.

In the progression depicted, the continuous increase of the internal pressure in the air bag deviates from the standard progression (depicted in dashed lines) starting at the time point $t_2$ and increases super-proportionally. This symbolizes the contact with the body of the vehicle passengers, whereby the air bag volume is for a short time reduced by the pressing in, so that as a result, the pressure is increased for a short time, in comparison with the standard undisturbed progression.

The time point $t_2$ and the internal pressure built up already in the air bag are the two critical values. If the body contact were to occur earlier than at time point $t_2$, not enough gas would yet have flowed into the interior of the air bag, in order to be able to provide a cushioning effect by the pressure already built up. This is attributable to the leakage, acting from the beginning, due to the air outlet opening 4.

SUMMARY OF THE INVENTION

In view of this background, it is now the object of the present invention to further develop a known air bag module, such that its dynamic cushioning behavior is improved.

This object is achieved by an airbag module of the type described above wherein the effective opening diameter of the air outlet opening is opened in a time-delay manner after activation of the module such that the gas pressure in the interior of the airbag remains substantially constant for a time period of up to 50 milliseconds. Further advantageous developments emerge from the dependent claims.

Therefore, it is proposed that the effective opening diameter of the air outlet opening in the air bag be opened in a time-delay manner after the activation of the module. This means that a leakage of the gas, which has flowed directly into the air bag, does not occur through the air outlet opening right from the beginning of the filling operation of the air bag, but to the contrary, the internal pressure can build up completely starting from the beginning. A deep-lying pressure valley of the sort at the value $P_1$ starting from the time point $t_1$ (FIG. 2) is not reached by the air bag module according to the invention. On the contrary, after the complete unfolding all of the gas is available for inflating the air bag. In contrast to the known air bag modules, a considerable safety reserve is thereby obtained for the situation in which the body contact with the air bag occurs very quickly.

According to a preferred embodiment, the air outlet opening produces its effective opening diameter in such a time-delayed manner, that the gas pressure remains essentially stays constant in the interior of the air bag for a time period of up to 50 ms. For this, a brief volume increase of the air bag is necessary, namely so that the increasing pressure due to the gas subsequently flowing during the filling phase is compensated by a volume increase.

This is achieved in a preferred embodiment in that the air outlet opening is located at the end of a tube-shaped mouthpiece on the air bag, which is turned into the air bag in the non-filled condition.

If the air bag is now activated, no gas flows at first out of the air outlet opening provided on the end of the tube which points inside the air bag, so that after the complete unfolding of the air bag, all gas is therefore available for building up the pressure. During the filling operation, the tube-shaped mouthpiece is now pushed from the interior of the air bag to the outside, so that at the same time a volume increase is therefore to be noted, whereby the plateau of constant internal pressure in the air bag is obtained. Only at the end of the internal pressure plateau does the opening at the end of the tube become opened, so that gas can flow out of the air bag.

The time duration of the period of substantially constant internal pressure is thus a function of the length and the diameter of the tube-shaped mouthpiece. The longer the tube, the later the air outlet opening becomes open and, correspondingly, gas can flow out of the air bag to the outside. In particular, the effective length of the tube is a determined parameter, which is understood to be that length which is turned into the inside of the air bag in the ready-to-operate condition of the air bag module. The progression of the internal pressure can be given by both parameters.

By the air bag module according to the invention, a safety reserve in the temporal progression of the internal pressure of the air bag is thereby obtained compared to known air bag modules.

BRIEF DESCRIPTION OF THE DRAWINGS

The invention is explained in greater detail on the basis of an embodiment according to the drawings. Shown are.

DETAILED DESCRIPTION OF THE INVENTION

Figure 1:
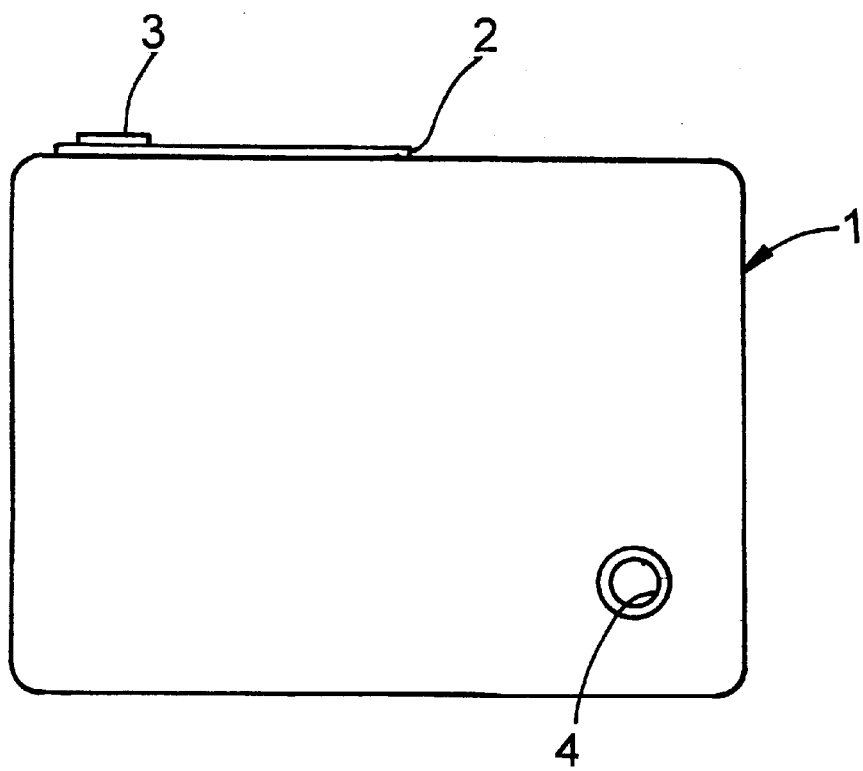

The air bag has, as does every known air bag, a connection plate 20 for a gas generator (not shown), which is connected to the air bag 10 via a filling nozzle 30.

In the present embodiment, a tube 50 is molded onto the right, lower corner and has the air outlet opening 40 on its end. The tube 50 is turned towards the inside in the ready-to-operate condition of the air bag, as indicated by the dashed lines. The tube 50 is depicted in continuous lines after successful activation of the air bag module with the tube 50 turned to the outside.

Figure 2:
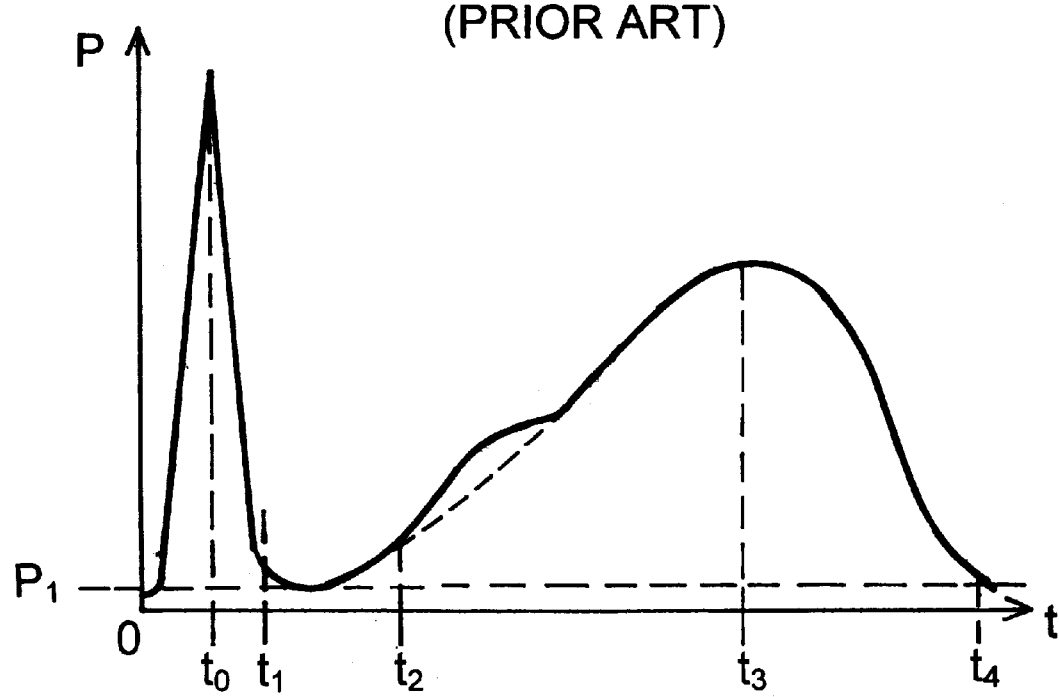
Figure 4:
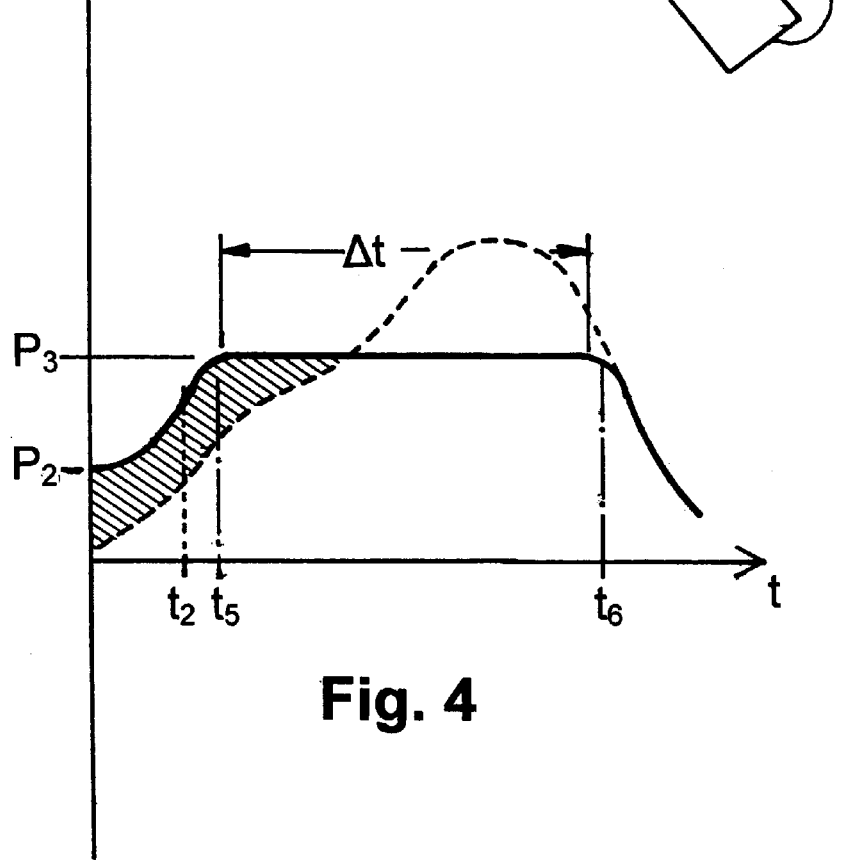
FIG. 4 is the temporal progression of the internal pressure in the air bag after activation of the air bag module in comparison to the typical progression in known air bags (dashed line).

The manner of behavior of the air bag 10 of the air bag module according to the invention is explained in greater detail using FIG. 4. This drawing shows the temporal progression of the internal pressure in the air bag 10 after activation of the air bag module at the time point t=0. The representation is analogous to that of FIG. 2. To make clear the gain of the safety reserve, the graph from FIG. 2 is depicted in dashed lines in FIG. 4.

Up to the time point $t_1$ the behavior corresponds fully to that of the air bag of an air bag module according to the prior art. Thus, reference is made to the explanations for FIG. 2 in order to avoid repetition.

Starting at the time point $t_1$, however, the air bag behaves in a completely different manner. At first, the internal pressure drops not to the low value $P_1$, as is the case for the air bag according to the prior art. Based on the non-occurrence of a leakage from an air outlet opening already opened at this point in time, the internal pressure reaches its lowest value at the value $P_2$, which amounts to approximately two to three times the value $P_1$. All gas conducted from the gas generator into the air bag 10 contributes to the build-up of the internal pressure starting with the point in time $t_1$. At the point in time $t_5$ the tube 50, which is turned into the interior air bag, begins to roll out to the outside such that a brief increase in volume occurs, so that in spite of further incoming gas the pressure remains essentially constant at the level $P_3$ until the point in time $t_6$, at which the air outlet opening 40 is opened. After that, gas flows towards the outside out of the air bag, and the internal pressure drops off correspondingly.

Figure 3:
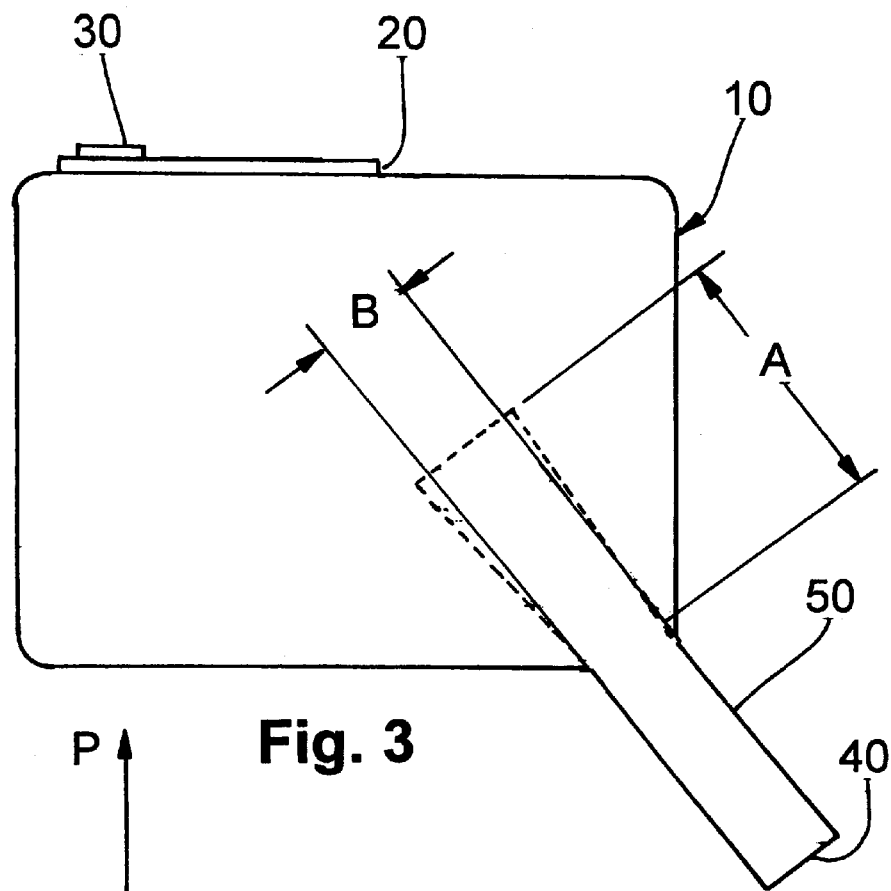
FIG. 3 is the schematic view of an air bag of the air bag module.

The time duration between the time points $t_5$ and $t_6$ having constant internal pressure can amount to up to 50 ms. The effective length is determined by the relationship of the length A of the tube 50, which is turned into the inside of the air bag (FIG. 3), and its diameter B. By changing the ratio B/A, the characteristic curve of the internal pressure progression is predetermined accordingly.

The hatched area between the characteristic curve of the air bag according to the prior art and the characteristic curve of the air bag according to the invention illustrates the gain of a safety reserve, since the internal pressure in the air bag 10 according to the invention reaches the necessary pressure values at a substantially earlier point in time than for the known air bag. The time gain can amount to several milliseconds and acts in a decidedly positive manner at these values, since the air bag shows a satisfactory cushioning behavior for body contact at this temporal gain. The time point $t_2$ from FIG. 2 is also entered in FIG. 4 for illustration, which—as described—represents the time point of the body contact. The internal pressure built up at this time point $t_2$ in the air bag 10 according to the invention amounts, in the example shown, to approximately double that of the internal pressure which is prevalent at time point $t_2$ in the air bag according to the prior art.

What is claimed is:

1. Air bag module having a gas generator, which upon a trigger signal instantaneously conducts gas into an air bag (10) made of substantially air-impermeable material, which has an air outlet opening (40) at the end of a tube-shaped mouthpiece (50) through which the gas flows out of the air bag after a dwell time in the air bag (10), the tube-shaped mouthpiece being turned into the air bag when the air bag is in a non-filled condition, wherein the effective opening diameter of the air outlet opening (40) is opened in a time-delay manner after activation of the module, the effective opening diameter of the air outlet opening being opened in such a time-delay manner that the gas pressure in the interior of the air bag remains substantially constant for a time period of up to 50 ms.

* * * * *